United States Patent
Komedani (10) Patent No.: US 11,916,904 B2
(45) Date of Patent: Feb. 27, 2024

(54) ELECTRONIC CONTROL UNIT AND COMMUNICATION SYSTEM

(71) Applicant: DENSO CORPORATION, Kariya (JP)

(72) Inventor: Akira Komedani, Kariya (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 17/457,097

(22) Filed: Dec. 1, 2021

(65) Prior Publication Data

US 2022/0094684 A1 Mar. 24, 2022

Related U.S. Application Data

(63) Continuation of application No. PCT/JP2020/016512, filed on Apr. 15, 2020.

(30) Foreign Application Priority Data

Jun. 4, 2019 (JP) .................................. 2019-104708

(51) Int. Cl.
*H04L 9/40* (2022.01)
*H04L 9/32* (2006.01)

(52) U.S. Cl.
CPC ............ *H04L 63/0876* (2013.01); *H04L 9/32* (2013.01); *H04L 63/123* (2013.01)

(58) Field of Classification Search
CPC ..... H04L 63/08; H04L 63/0876; H04L 63/12; H04L 63/123; H04L 63/126; H04L 9/32;
(Continued)

(56) References Cited

U.S. PATENT DOCUMENTS

2010/0296395 A1 11/2010 Fukuda et al.
2014/0334383 A1 11/2014 Sakemi et al.
(Continued)

FOREIGN PATENT DOCUMENTS

JP 2010-273225 A 12/2010
JP 2012-169829 A 9/2012
(Continued)

OTHER PUBLICATIONS

Eric Rescorla, Nagendra Modadugu, Datagram Transport Layer Security, (Network Working Group Request for Comments: 4347 Category: Standards Track), The Internet Society, Apr. 2006.
(Continued)

*Primary Examiner* — Shaqueal D Wade-Wright
(74) *Attorney, Agent, or Firm* — Harness, Dickey & Pierce, P.L.C.

(57) ABSTRACT

An electronic control unit, which receives a message and a freshness value given to the message via a connectionless communication, includes a storage unit storing a freshness value list, which indicates a predetermined number of freshness values in a descending order from a reference value, which is a largest freshness value among the freshness values received in a past. The electronic control unit compares a received value, which is the received freshness value, with the freshness value list to provide a verification result, and updates the freshness value list so as to hold the received value in response to the verification result indicating that (i) the received value is not larger than the reference value and not smaller than a permissible value which is a smallest freshness value in the freshness value list, and (ii) the received value is not in the freshness value list.

11 Claims, 7 Drawing Sheets

(58) Field of Classification Search
CPC ........ H04L 9/3242; G09C 1/00; H04W 12/10; H04W 12/108
See application file for complete search history.

(56) References Cited

U.S. PATENT DOCUMENTS

| | | |
|---|---|---|
| 2017/0034867 A1 | 2/2017 | Oshida |
| 2018/0131522 A1* | 5/2018 | Lawlis .................. H04L 9/0631 |
| 2018/0219872 A1 | 8/2018 | Sugashima et al. |
| 2019/0123908 A1* | 4/2019 | Morita .................. H04L 9/3242 |
| 2019/0207950 A1* | 7/2019 | Mohammed ............ H04L 63/14 |
| 2022/0006665 A1* | 1/2022 | Kajuluri .................. H04W 4/48 |
| 2023/0199500 A1* | 6/2023 | Geng .................. H04W 12/122 |
| | | 455/410 |

FOREIGN PATENT DOCUMENTS

| | | |
|---|---|---|
| JP | 2017-028654 A | 2/2017 |
| JP | 2017-038365 A | 2/2017 |
| WO | WO-2013-140455 A1 | 9/2013 |

OTHER PUBLICATIONS

Stephen Kent, Randall Atkinson, IP Encapsulating Security Payload (ESP), (Network Working Group Request for Comments: 2406 Obsoletes: 1827 Category: Standards Track), The Internet Society, Nov. 1998.
Stephen Kent, Randall Atkinson, Security Architecture for the Internet Protocol (Network Working Group Request for Comments: 2401 Obsoletes: 1825 Category: Standards Track), The Internet Society, Nov. 1998.
Stephen Kent, Randall Atkinson, IP Authentication Header (Network Working Group Request for Comments: 2402 Obsoletes: 1826 Category: Standards Track), The Internet Society, Nov. 1998.
Specification of Module Secure Onboard Communication, Identification No. 654, AUTOSAR Release 4.2.2.
Specification of Secure Onboard Communication, Identification No. 654, Autosar CP Release 4.3.1.
IEEE Standard for Local and metropolitan area networks—Media Access Control (MAC) Security, IEEE Computer Society Sponsored by the LAN/MAN Standards Committee, IEEE Std 802.1AE™—2018.

* cited by examiner

| (REFERENCE VALUE) (PERMISSIBLE VALUE) | 0 |
|---|---|
| | - |
| | - |
| | - |
| | - |

(a) FV LIST 1

| (REFERENCE VALUE) | 1 |
|---|---|
| (PERMISSIBLE VALUE) | 0 |
| | - |
| | - |
| | - |

(b) FV LIST 2

| (REFERENCE VALUE) | 5 |
|---|---|
| | 1 |
| (PERMISSIBLE VALUE) | 0 |
| | - |
| | - |

(c) FV LIST 3

| (REFERENCE VALUE) | 7 |
|---|---|
| | 6 |
| | 5 |
| | 3 |
| (PERMISSIBLE VALUE) | 2 |

(d) FV LIST 4

FIG. 6

| (REFERENCE VALUE) | 201 |
|---|---|
| | 120 |
| | 119 |
| | 118 |
| (PERMISSIBLE VALUE) | 117 |

ELECTRONIC CONTROL UNIT AND COMMUNICATION SYSTEM

CROSS REFERENCE TO RELATED APPLICATIONS

The present application is a continuation application of International Patent Application No. PCT/JP2020/016512 filed on Apr. 15, 2020, which designated the U.S. and claims the benefit of priority from Japanese Patent Application No. 2019-104708 filed on Jun. 4, 2019. The entire disclosures of all of the above applications are incorporated herein by reference.

TECHNICAL FIELD

This application relates to a verification of a message for ensuring the security of an electronic control unit (ECU), and is mainly used for an in-vehicle electronic control unit.

BACKGROUND

In recent years, electronic control units have come to be used in vehicles such as automobiles not only for driving and braking, but also for the overall environment inside the vehicle, and communication. Further, the developments of (i) safe driving support systems that provide driving support to drivers and (ii) automatic driving systems that do not require the driver itself are becoming active. In these trends, unauthorized access to the in-vehicle network connected to the electronic control units becomes a big problem. If the electronic control unit is illegally controlled by unauthorized access by a malicious third party, the safety in driving a vehicle will be threatened. Therefore, various techniques related to the security of electronic control units for vehicles have been proposed.

One of the unauthorized access is called a replay attack, which steals a legitimate message and sends the stolen message as it is to impersonate the legitimate message. For such a replay attack, a method has been proposed which uses a counter or a time stamp given to the message to determine whether the message is a correct message or an incorrect message due to the replay attack.

SUMMARY

According to an example of the present disclosure, an electronic control unit is provided to receive a message and a freshness value given to the message via a connectionless communication. The electronic control unit includes a storage unit, and a receiver unit. The storage unit is configured to store a freshness value list, which indicates a predetermined number of freshness values in a descending order from a reference value, which is a largest freshness value among the freshness values received in a past. The electronic control unit compares a received value, which is the freshness value received by the receiver unit, with the freshness value list to provide a verification result, and update the freshness value list so as to hold the received value in response to the verification result indicating that (i) the received value is not larger than the reference value and not smaller than a permissible value which is a smallest freshness value in the freshness value list, and (ii) the received value is not in the freshness value list.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

The following will describe embodiments of the present disclosure with reference to the drawings. When there are multiple embodiments, a configuration disclosed in each embodiment is not limited to each embodiment, but can be combined across embodiments. For example, a configuration disclosed in one embodiment may be combined with other embodiments. Configurations disclosed in the respective multiple embodiments may be collected and combined.

The following embodiments will be described mainly by using an in-vehicle electronic control unit for an automobile as an example, but the present disclosure includes an electronic control unit and the like other than those for in-vehicle use, unless limited within the present disclosure.

First Embodiment

1. Configuration of Communication System

Figure 1:
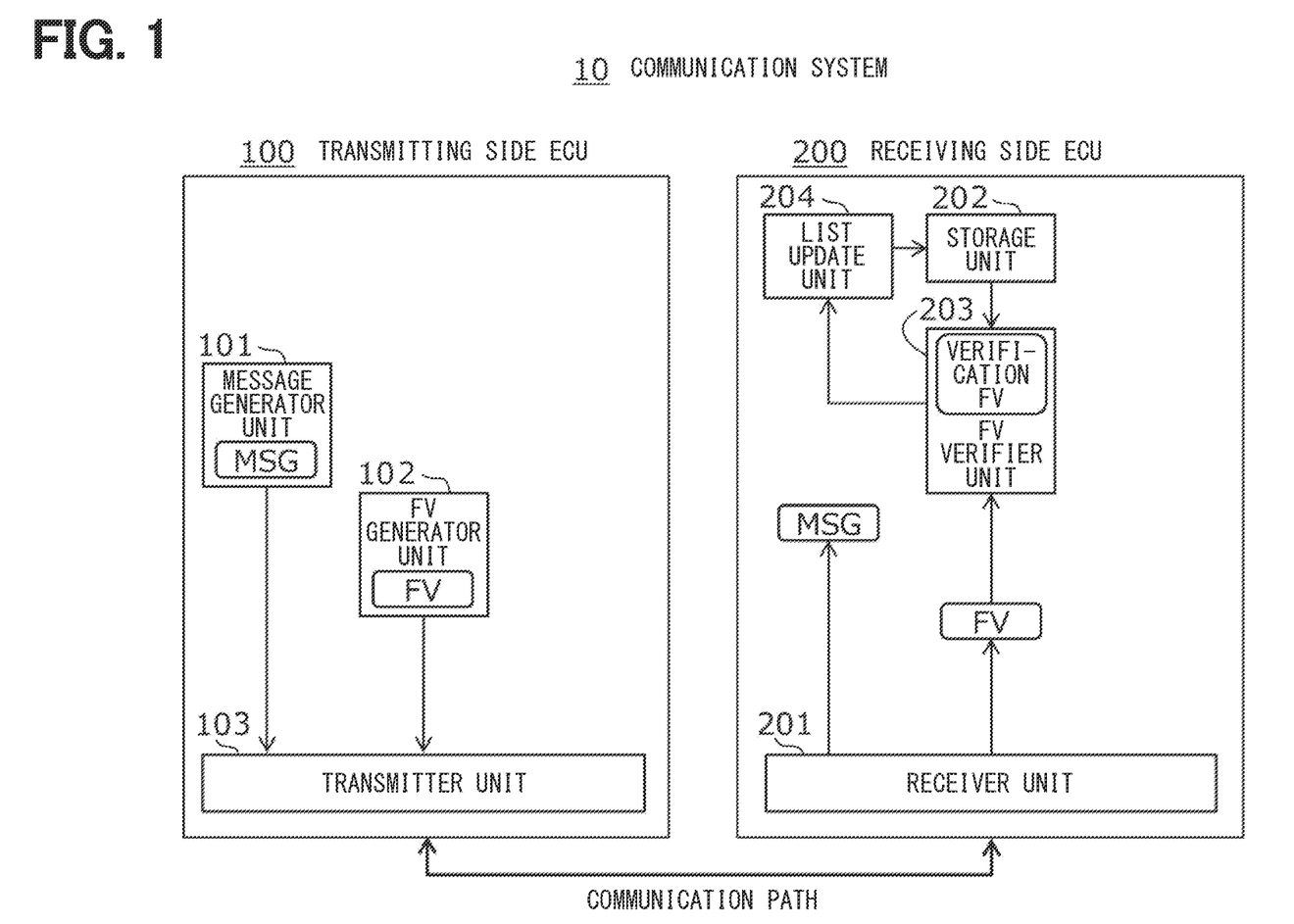
FIG. 1 is a block diagram illustrating a configuration of a communication system and electronic control units according to a first embodiment.

FIG. 1 shows a communication system 10 of the present embodiment. The communication system 10 includes a plurality of "electronic control units" and a communication path connecting them. The plurality of "electronic control units" include a transmitting side electronic control unit 100 (hereinafter, a transmitting side ECU 100) that transmits a frame containing a message, and a receiving side electronic control unit 200 (hereinafter, a receiving side ECU 200). The following embodiments will be described on the premise that a plurality of electronic control units transmit and receive frames using a connectionless communication method such as Ethernet (registered trademark), but the present disclosure is not limited to this example.

Here, the "electronic control unit" may be any device that can acquire or process information and can transmit and/or receive information with another device. In addition to in-vehicle electronic control units, for example, computers (personal computers, embedded microcomputers, etc.), communication devices (mobile phones, smartphones, tablets, base stations, etc.), circuit boards, semiconductor modules, or semiconductors are included in the "electronic control unit". All forms of finished products, semi-finished products, and parts may be also included.

2. Configuration of Transmitting Side ECU

The transmitting side ECU 100 of the present embodiment includes a message generator unit 101, an FV generator unit 102, and a transmitter unit 103 which may also be referred to as a transmitter 103. The transmitting side ECU 100 and the individual functional blocks constituting the transmitting side ECU 100 may be implemented by a dedicated or general purpose central processing unit, memory, bus, and a program that is loaded and executed in memory, or may be implemented by a dedicated hardware such as a semiconductor module or a circuit board. The same applies to the receiving side ECU 200 described later.

The message generator unit 101 generates a message (MSG), which is to be transmitted to the receiving side ECU 200. Specific examples of messages in the case of an in-vehicle ECU mounted on a vehicle include various control data for controlling the vehicle. In the case of an ECU other than that for in-vehicle use, for example, detection data, text data, voice data, image data, etc. detected by a sensor or the like can be mentioned as examples of messages.

Here, in the communication between the electronic control units, it is not possible to transmit and receive data exceeding the maximum data size (MTU: Maximum Transmission Unit) determined for each communication method at one time. The data exceeding the MTU thus needs to be divided into sizes smaller than the MTU. Therefore, when the vehicle control data or the like exceeds a predetermined MTU, the message generator unit 101 divides the vehicle control data or the like into a transmittable size and generates a plurality of divided messages.

The embodiment shown below will describe an example in which the message generator unit 101 divides data to generate divided messages. However, when the size of the control data is equal to or smaller than the maximum data size, the message generator unit 101 may transmit the data to the receiving side ECU 200 without dividing the data.

The FV generator unit 102 generates a "Freshness Value (FV)" according to the number or the scheduled number of transmissions of frames transmitted from the transmitter unit 103, which will be described later. This freshness value is a value that is updated according to preset update conditions. The FV generator unit 102 generates a freshness value by counting the number of transmissions for each message ID set according to the type of data included in the message stored in the frame, for example. For example, when the frame to which the message ID #1 is given is transmitted four times, the freshness value of the message #1 is 4 (FV=4). In the following embodiments, the number of transmissions of a frame is referred to as a message counter (MsgCnt). The update condition of the message counter (corresponding to the "lower update condition") is the transmission of a frame from the transmitting side ECU 100.

Here, the "freshness value" is a value indicating the number of times a specific frame is transmitted from a transmitting side electronic control unit or received by a receiving side electronic control unit, and is a concept including a counter and a sequence number. In addition to the absolute value, for example, a relative value counted from a certain reference is also included.

The FV generator unit 102 may generate a freshness value in consideration of the number of "activations" of the transmitting side ECU in addition to the number of transmissions of the frame. The FV generator unit 102 counts, for example, the number of activations of the transmitting side ECU, the number of wakeups, the number of resets, or the number of times the ignition of the vehicle equipped with the communication system 10 is changed from OFF to ON. A freshness value is then generated to include a value indicating the above counted number and a value indicating the number of transmissions of the frame. In the following embodiments, the number of activations of the transmitting side ECU is referred to as a trip counter (TripCnt). The update condition of the trip counter (corresponding to the "upper side update condition") is the activation of the transmitting side ECU 100. When the freshness value is composed of a trip counter and a message counter, the value of the message counter may be initialized, that is, be reset to 0 each time the trip counter is increased or initialized.

Here, "activation" means changing from a state in which the electronic control unit is not operating to a state in which it can operate. This includes not only turning on the power of the electronic control unit to activate it, but also waking up the electronic control unit from the sleeping state and returning the electronic control unit from the reset state. Further, the number of "activations" may indicate the number of times the electronic control unit has been activated as a result. It does not necessarily have to be the number of times obtained by counting the number of activations of the electronic control unit. For example, the number of times the system or vehicle equipped with the electronic control unit is activated may be counted to obtain the number of activations.

The transmitter unit 103 adds or inserts a freshness value generated by the FV generator unit 102 to the message generated by the message generator unit 101, and transmits a frame to which a header is added. A specific receiving side ECU 200 may be specified as the transmission destination, but the transmission may be performed by broadcasting without specifying the transmission destination. That is, it is only required for the message or frame to be received by the receiving side ECU 200.

When the communication system 10 is an in-vehicle system, the generation of the freshness value and the addition of the freshness value to the message can be realized by, for example, the SecOC (Secure Onboard Communication) of AUTOSAR, which formulates the standard software architecture of the in-vehicle electronic control unit.

Figure 2:
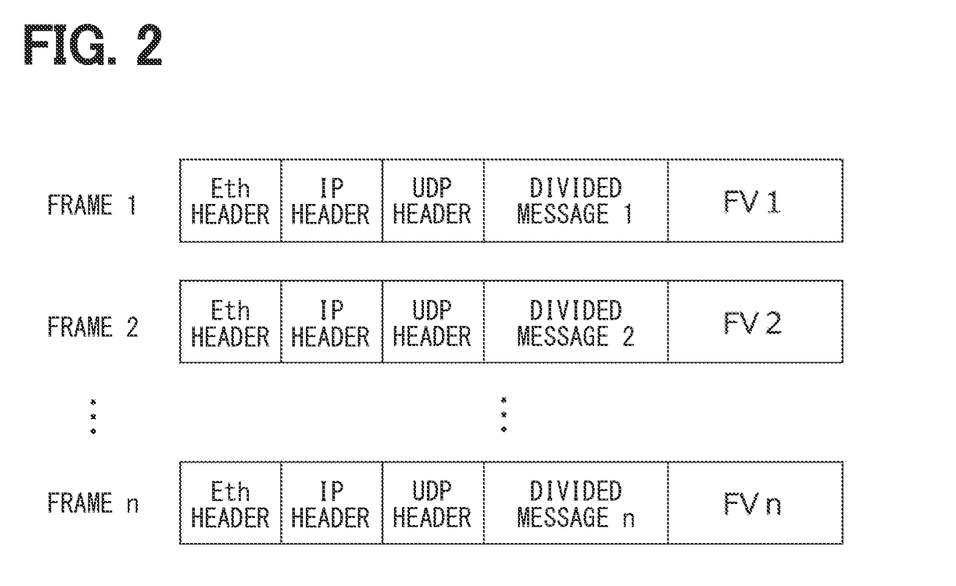
FIG. 2 is a diagram illustrating frames transmitted and received in the communication system according to the first embodiment.

FIG. 2 is a diagram illustrating an example of a frame transmitted from the transmitting side ECU 100. Each frame of FIG. 2 includes (i) an Ethernet header (Eth header) given by the data link layer, (ii) an IP header given by the network layer, (iii) a UDP header given by the transport layer, (iv) a divided message, and (v) a freshness value (FV) generated by the FV generator unit 102.

In FIG. 2, the divided messages 1 to n and the freshness values 1 to n are stored in the frames 1 to n, respectively. That is, the message generator unit 101 divides the control data to generate n divided messages. Further, the freshness values 1 to n given to these divided messages are successive values. Then, the transmitter unit 103 transmits the frames shown in FIG. 2 in order from the frame 1.

Note that FIG. 2 shows a frame when a connectionless communication method is used, and a UDP header is added to the message. However, when communication is performed using a connection communication method, a TCP header may be added instead of the UDP header.

Figure 3:
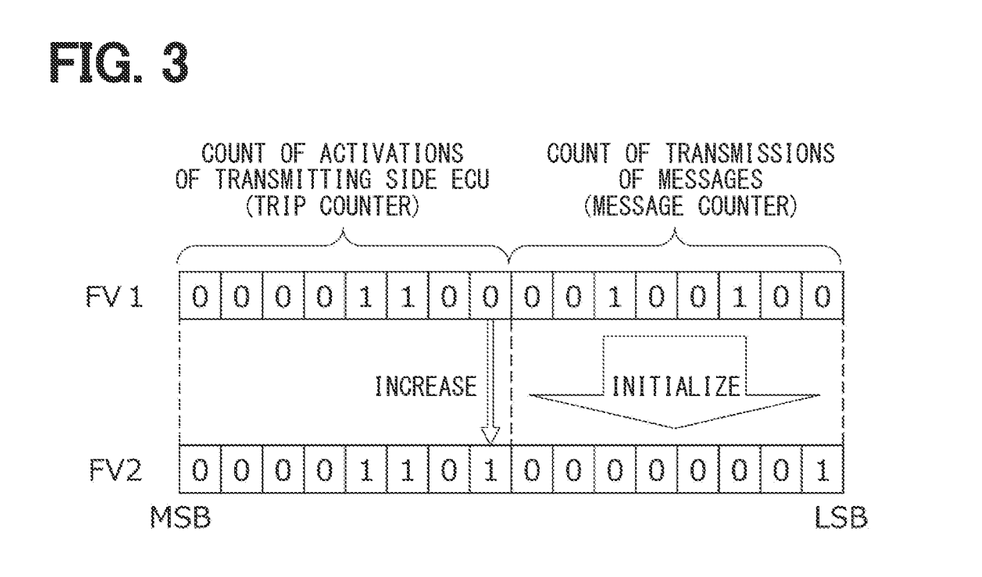
FIG. 3 is a diagram illustrating a freshness value according to the first embodiment.

FIG. 3 further shows an example of the configuration of the freshness value included in the frame. The freshness value in FIG. 3 is composed of an upper 8 bit indicating a trip counter and a lower 8 bit indicating a message counter.

For example, FV1 shown in FIG. 3 is composed of a trip counter "00001100" and a message counter "001100100". In contrast, in FV2, the trip counter in the 8th digit of the upper bits is increased by 1 as compared with FV1; the value of the message counter is initialized as the trip counter increases, and the value is newly counted from 1. As shown in FIG. 3, when the value of the 8th digit in the upper bits increases, the value of the entire freshness value increases by a maximum of 2 to the 8th power ($2^8$).

The frame of FIG. 2 and the freshness value of FIG. 3 are merely examples. There is no need to be limited to these configurations. For example, the freshness value shown in FIG. 3 may be composed of the upper bits indicating a message counter and the lower bits indicating a trip counter. Alternatively, the freshness value may be composed of values other than the message counter and trip counter. For example, instead of the trip counter or the message counter, the freshness value may be composed of a counter whose value increases or decreases at regular intervals. However, when the freshness value is composed of two or more counters, it is desirable that the counter constituting the upper bits and the counter constituting the lower bits are values updated by different update conditions.

Further, the maximum value may be set in advance for the value of the trip counter or the message counter. In such a case, when the value of the counter exceeds the maximum value, that is, when the update condition occurs after the maximum value is reached, the value of the counter is initialized and counting is started again.

3. Configuration of Receiving Side ECU

The receiving side ECU 200 of the present embodiment includes a receiver unit 201 which may also be referred to as a receiver 201, a storage unit 202 which may also be referred to as a storage 202, an FV verifier unit 203, and a list update unit 204.

The receiver unit 201 receives the frame transmitted from the transmitting side ECU 100. This frame is the frame shown in FIG. 2, that is, the frame in which the message and the freshness value given to the message are stored.

As described above, in the present embodiment, communication between electronic control units is performed using a connectionless communication method. Therefore, even if the transmitting side ECU 100 transmits the frames shown in FIG. 2 in order from the frame 1, the order of the frames may be changed on the communication path. That is, the receiver unit 201 may receive the frame 2 or the frame n before the frame 1 shown in FIG. 2.

The storage unit 202 is a non-volatile memory such as a flash memory or a hard disk (HDD), or a volatile memory such as a DRAM or SRAM. The storage unit 202 stores a received freshness value list (hereinafter, FV list). The FV list is a list showing a "predetermined" number of freshness values in descending order from the largest freshness value among the freshness values transmitted from the transmitting side ECU 100 and received by the receiver unit 201. More than one identical freshness value is not retained in the FV list. In the FV list, the one with the largest value is used as a reference value, and the one with the smallest value is used as a permissible value. The permissible value refers to a value for allowing a decrease in the freshness value in consideration of the change of order of frames on the communication path. Here, the term "predetermined" may include "always constant" and "uniquely determined according to condition".

The storage unit 202 may store the FV list for each message ID and each message type. In this case, the number of freshness values included in the FV list may differ for each FV list according to the message ID and the type of message, and the number of freshness values for each FV list is preset by the factory or the dealer. Alternatively, as will be described later, the number of freshness values included in the FV list may be a value that changes with time according to various parameters.

When the FV verifier unit 203, which will be described later, determines that the freshness value is correct, the FV list stored in the storage unit 202 is updated to retain the freshness value determined to be correct. Therefore, immediately after the vehicle equipped with the communication system 10 is started for the first time, there is no freshness value transmitted from the transmitting side ECU 100, and of course, there is no freshness value determined to be correct. Further, when the storage unit 202 is a volatile memory, the same applies immediately after the vehicle is newly started or the ignition is turned on. Therefore, the initial value set by the factory or the dealer may be stored in advance in the storage unit 202 as the reference value of the FV list. When the value of the trip counter is initialized, the FV list stored in the storage unit 202 is also initialized and returned to the initial value.

When the freshness value is composed of a trip counter and a message counter, the trip counter value among the freshness values may be stored in the non-volatile memory of the storage unit 202, and the message counter value may be stored in the volatile memory of the storage unit 202.

The FV verifier unit 203 compares the freshness value (hereinafter referred to as the received value) received by the receiver unit 201 with the freshness value included in the FV list stored in the storage unit 202. As a result of comparison, when the received value satisfies the following first condition or second condition, it is determined that the received value is correct and the verification result is OK or affirmative. Here, the first condition is that the received value is larger than the reference value (reference value <received value). The second condition is that (i) the received value is not larger than the reference value and not smaller than the permissible value (permissible value ≤received value ≤reference value), and (ii) the received value is not in the FV list. In contrast, when the received value does not satisfy the first and second conditions, for example, when the received value is smaller than the permissible value (received value <permissible value), the freshness value is incorrect and the verification result is determined to be NG or negative.

When the FV verifier unit 203 determines that the received value is correct, the list update unit 204 updates the FV list so as to hold the received value determined to be correct. The updated FV list becomes a list including the received value.

When the storage unit 202 stores a plurality of FV lists, the list update unit 204 updates the FV list corresponding to the message ID of the received value. That is, when the verification result is OK, the receiving side ECU holds the freshness value and updates the FV list corresponding to the message ID. Then, the FV list includes the values up to n (E_ReceivedFreshnessValueListSize) counting from the largest value among the freshness values held so far.

The list update unit 204 further may set as appropriate the number of freshness values included in the FV list depending on (i) the communication status of the communication system such as the occurrence status of frame order change in the communication path, frame reception frequency, or communication path congestion status, (ii) the number of divided messages, or (iii) the size of the divided message. For example, when the order of the frames is changed, the list update unit 204 extends the permissible range of freshness values by increasing the number of freshness values included in the FV list. If the order of the frame is not changed, the list update unit 204 maintains or reduces the number of freshness values so as not to extend the permissible range of freshness values. Note that whether or not the order of the frames is changed can be determined according to the comparison verification result by the FV verifier unit 203, that is, whether the first condition or the second condition is satisfied. That is, when the verification result by the FV verifier unit 203 is the first condition, the order of the frames is determined to be not changed. When the verification result by the FV verifier unit 203 is the second condition, the order of the frames is determined to be changed. By changing the number of freshness values included in the FV list according to the communication status, it is possible to set a permissible range of freshness values suitable for the actual communication status between the electronic control units.

4. Message Reception Method and a Program that Executes the Same Method

A message reception method executed by the receiving side ECU 200 will be described with reference to FIG. 4.

Figure 4:
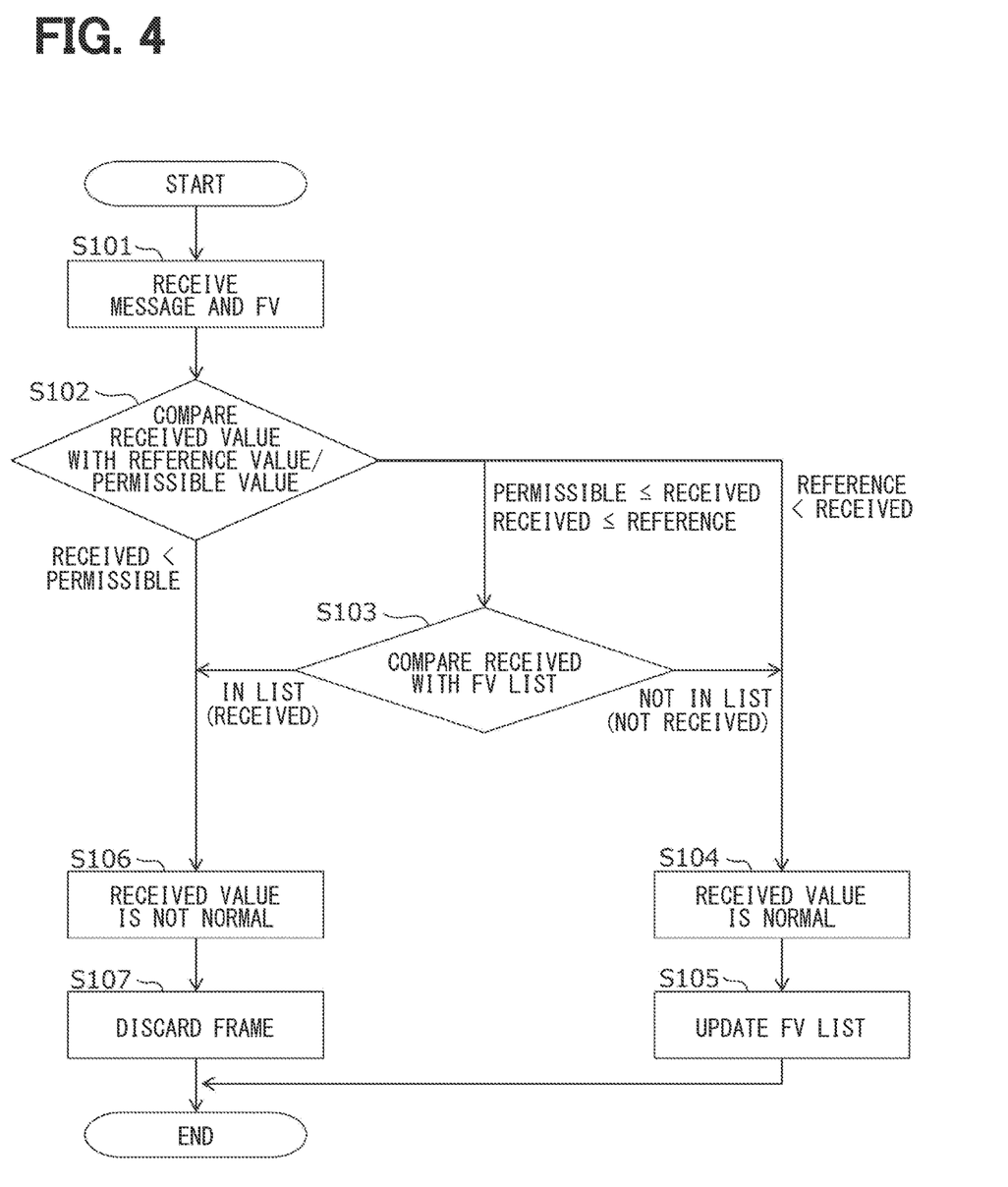
FIG. 4 is a diagram illustrating an operation of a receiving side electronic control unit according to the first embodiment.

Note that FIG. 4 not only shows a method of receiving a message in the electronic control unit, but also shows processing steps of a program executed by the electronic control unit. It should be noted that the order of the steps illustrated in FIG. 4 can be appropriately changed unless a certain step is a prerequisite for the next step. The same applies to a second embodiment, which will be described later.

The receiving side ECU 200 executes each of the following steps. The message and the freshness value (FV) given to the message are received from the transmitting side ECU (S101). Next, the received value, which is the freshness value received in S101, is compared with the reference value and the permissible value in the FV list stored in the storage unit (S102). As a result of comparison in S102, when the received value is not larger than the reference value and not smaller than the permissible value, the received value is further compared with the FV list, and it is determined whether or not the received value is in the FV list (S103). Then, when the received value has not been received and is not in the FV list, it is determined that the received value is correct (S104). Further, as a result of comparison in S102, even when the received value is larger than the reference value, it is determined that the received value is correct (S104). Then, when it is determined in S104 that the received value is correct, the FV list is updated so as to hold the received value determined to be correct (S105).

On the other hand, as a result of comparison in S102, when the received value is smaller than the permissible value, it is determined that the received value is not correct (S106). Further, as a result of comparison in S103, even when the received value is in the FV list, it is determined that the received value is not correct (S106). Then, when it is determined in S106 that the received value is not correct, the frame to which the received value is given is discarded (S107).

Figure 5:
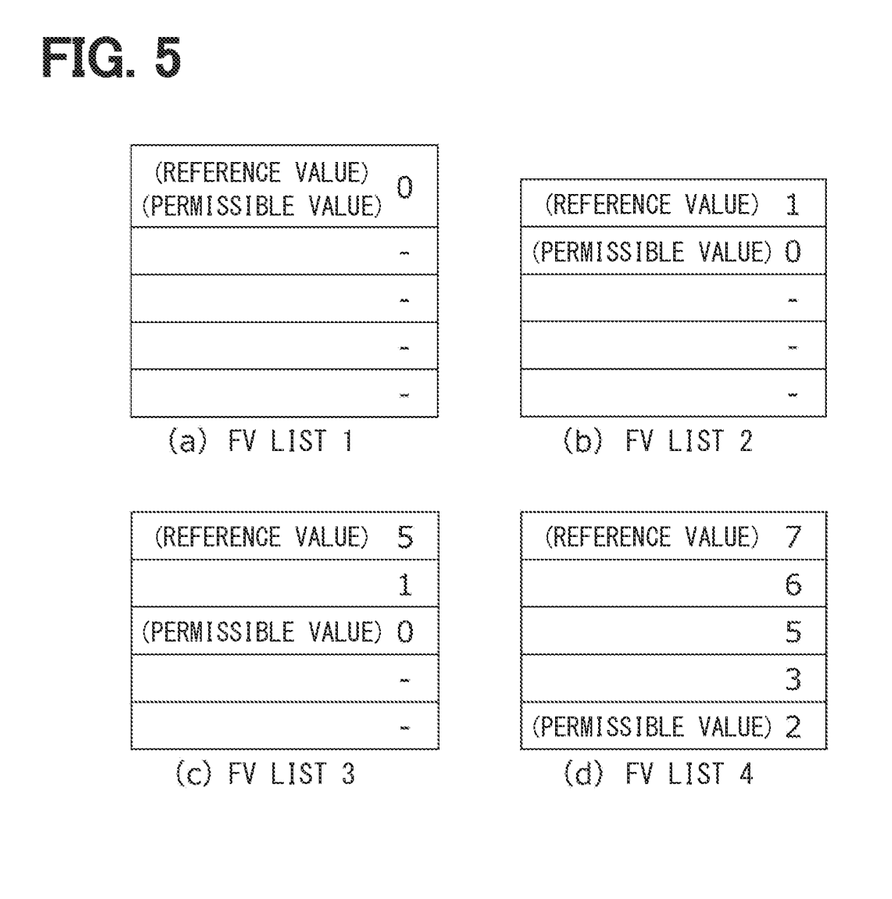
FIG. 5 is a diagram illustrating lists of freshness values having been received according to the first embodiment.

FIG. 5 shows an example of the FV list of the present embodiment. In this example, the reference value and the permissible value are set to 0 in advance as initial values. Further, the FV list shows a case where five freshness values are shown in order counting from the reference value.

In FIG. 5, (a) shows the FV list 1 immediately after the vehicle is activated for the first time. Since there is no freshness value determined to be correct by the FV verifier unit 203, the FV list 1 shows only the reference value and the permissible value (FV=0) set as the initial values.

Consider the case where the freshness value (FV=1) is received in the state of the FV list 1 shown in (a) in FIG. 5. Since the received value (FV=1) is larger than the reference value (FV=0), it is determined that the received value is correct and the FV list is updated. In FIG. 5, (b) shows the FV list 2 after updating the FV list 1. In the FV list 2, the maximum freshness value (FV=1) is the reference value, and the minimum freshness value (FV=0) is the permissible value.

Next, the case where the freshness value (FV=5) is received in the state of the FV list 2 shown in (b) in FIG. 5 will be examined. The received value (FV=5) is a value equal to or larger than the reference value (FV=1) (i.e., a value not smaller than the reference value (FV=1)). Therefore, the received value is determined to be correct, and the FV list is updated. In FIG. 5, (c) shows the FV list 3 after updating the FV list 2.

Further, suppose the case where the freshness value (FV=3) is received in the state of the FV list 3 shown in (c) in FIG. 5. In this case, the received value (FV=3) is equal to or smaller than the reference value (FV=5) and equal to or larger than the permissible value (FV=0) and is not in the FV list 3 (i.e., the received value (FV=3) is (i) not larger than the reference value (FV=5) and not smaller than the permissible value (FV=0) and (ii) not in the FV list 3). Therefore, the received value is determined to be correct, and the FV list is updated. In FIG. 5, (d) shows the state after the following operations are finished. That is, the freshness value (FV=3, 2, 6, 7) are received after the freshness value (FV=5) is received. Thereby, it is determined that the received values are correct, and the FV list is updated. In the FV list 4 shown in (d) in FIG. 5, the maximum freshness value (FV=7) is the reference value, and the minimum freshness value (FV=2) is the permissible value. According to the FV list 4, it can be seen that the initial value (FV=0) and the freshness value (FV=1) listed in the FV lists 2 and 3 are excluded from the list.

In the present embodiment, when a third party makes a replay attack using a frame transmitted by the transmitting side ECU 100 in the past, the freshness value included in the invalid frame due to the replay attack is as follows. That is, the freshness value included in the invalid frame is one of the freshness values received by the receiving side ECU 200, and is equal to the freshness value included in the FV list of the receiving side ECU 200 or smaller than the permissible value in the FV list of the receiving side ECU 200. For example, in the state of the FV list 4 shown in (d) in FIG. 5 stored in the storage unit 202, when a third party makes a replay attack using a frame containing a freshness value (FV=6), the received value will be the same as the value in the FV list. Therefore, the FV verifier unit 203 can determine that the freshness value (FV=6) is not correct; thus the FV verifier unit 203 can determine that the message to which the freshness value is given is not correct. Further, when a third party makes a replay attack using a frame including a freshness value (FV=1), the received value is a value smaller than the permissible value of the FV list. Therefore, the FV verifier unit 203 can determine that the freshness value (FV=1) is not correct; thus, the FV verifier unit 203 can determine that the message to which the freshness value is given is not correct.

Further, in the present embodiment, when the order of the frames transmitted by the transmitting side ECU 100 is changed on the communication path, the receiving side ECU 200 receives the freshness value whose value is smaller than the freshness value already received. In the example shown in FIG. 5, the transmitting side ECU 100 transmits in order from the frame in which the freshness value having the smallest numerical value is stored. In contrast, the receiving side ECU 200 does not receive in order from the freshness value (FV=1), but receives the freshness value (FV=3) after the freshness value (FV=5), for example. However, in the present embodiment, a permissible value that allows a decrease in the freshness value is set. Therefore, even if the order of the frames is changed on the communication path, it is possible to prevent the correct freshness value from being erroneously determined to be incorrect.

Figure 6:
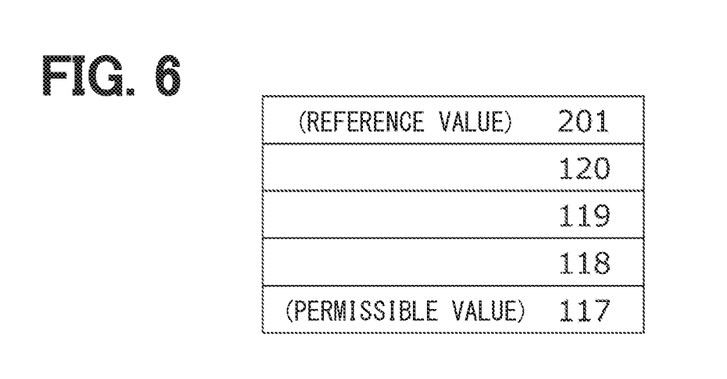
FIG. 6 is a diagram illustrating another example of a list of freshness values having been received according to the first embodiment.

FIG. 6 further shows an example of an FV list when the freshness value is composed of a trip counter and a message counter as shown in FIG. 6. For ease of explanation, in FIG. 6, the freshness value is represented by a three-digit numerical value, the upper one digit indicates a trip counter, and the lower two digits indicate a message counter. That is, the freshness value (FV=201) of the reference value of the FV list shown in FIG. 6 indicates that the trip counter is increased as compared with the other freshness values (FV=120, 119, 118, 117).

When the order of the frames storing the freshness values each composed of the trip counter and the message counter is changed on the communication path, the processing is performed in the same manner as in FIG. 5.

For example, the transmitting side ECU 100 transmits the freshness value (FV=121), and then transmits the freshness value (FV=201) in which the trip counter is increased from the freshness value (FV=121). When the order is changed on the communication path, the receiving side ECU 200 receives the freshness value (FV=201) and then the freshness value (FV=121). The FV list shown in FIG. 6 shows a list after receiving the freshness value (FV=201) and before receiving the freshness value (FV=121). When the freshness value (FV=121) is received in this state, the received value is not larger than the reference value (FV=201) and not smaller than the permissible value (FV=117), and is not in the FV list. Therefore, the freshness value (FV=121) is determined to be correct.

Here, for comparison with the present embodiment, a case where the correctness/incorrectness of the message is determined by using a permissible range different from that of the present embodiment will be examined. For example, consider the following case. The FV list, which is within the permissible range of freshness values, includes freshness values that are equal to or larger than the permissible value and equal to or smaller than the reference value; the reference value is the largest freshness value received so far, and the permissible value is the value obtained by subtracting a predetermined value from the reference value (reference value—[E_FreshnessValueToleranceWindow]). In this case, the difference between the reference value and the permissible value is always constant.

For example, even if a connectionless communication is performed between the transmitting side ECU and the receiving side ECU, it is conceivable that the order of arrival of the frames does not change, or the order of arrival varies depending on the communication status such as the communication method, the congestion status of the communication path, and the communication performance. However, according to the above method, since the difference between the reference value and the permissible value is always constant, it is difficult to set an appropriate permissible range according to the actual communication status.

Further, for example, consider a case where the receiving side ECU 200 receives the freshness value (FV=201), updates the FV list shown in FIG. 6, and then receives the freshness value (FV=121). In order to determine that the freshness value (FV=121) is correct, it is necessary to widen the range of the FV list by setting the predetermined value to be subtracted from the reference value to "80" in order to obtain the permissible value. However, if the range of the FV list is set wide, the security may be lowered, and the load of the memory for storing the FV list is increased. Further, if the predetermined value is made smaller and the range of the FV list is set narrower, there is a high possibility that the freshness value in which the order is changed is erroneously determined as not correct. For example, when the predetermined value is set to "10" in the example of FIG. 6, the permissible value is "191 (=201−0)", so that it is determined that the freshness value (FV=121) is not correct.

On the other hand, according to the present embodiment, by setting the FV list based on the number of freshness values, it is possible to automatically set a permissible range suitable for the communication status.

Further, even when the freshness value is rapidly increased due to the configuration of the freshness value, it is possible to prevent the correct freshness value from being erroneously determined.

The above-described embodiment has described the following case. That is, the freshness value transmitted from the transmitting side ECU 100 is a value that increases, and accordingly, the FV list shows the predetermined number of freshness values in descending order from the reference value, which is the largest freshness value among the received freshness values. However, the freshness value transmitted from the transmitting side ECU 100 may be a value that decreases. In this case, the FV list stored by the receiving side ECU 200 may be a list showing the predetermined number of freshness values in ascending order from the reference value, with the freshness value having the smallest value among the received freshness values as the reference value. In this example, the permissible value is the freshness value with the largest value in the FV list.

Second Embodiment

Figure 7:
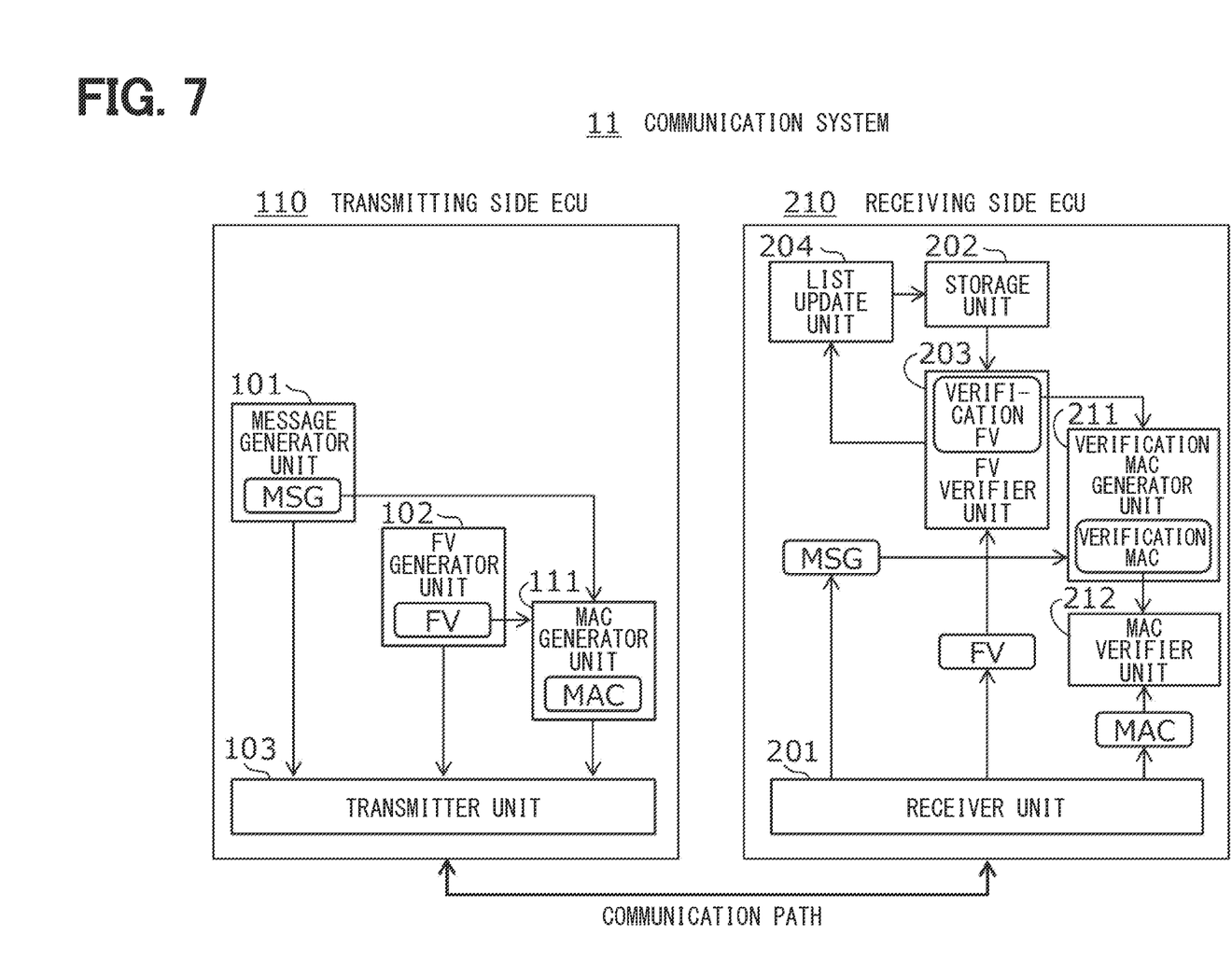
FIG. 7 is a block diagram illustrating a configuration of a communication system and electronic control units according to a second embodiment.

The first embodiment has described a configuration in which the freshness value and the FV list are used to prevent a replay attack by a third party and enhance the security of the communication system. Further, in the present embodiment, a configuration in which a message authentication code (MAC) as an authenticator is added to the message in addition to the freshness value to enhance the security of the communication system will be described focusing on the differences from the first embodiment. FIG. 7 shows the communication system 11 of a second embodiment, and the transmitting side ECU 110 and the receiving side ECU 210 constituting the communication system 11.

1. Configuration of Transmitting Side ECU

The transmitting side ECU 110 in FIG. 7 includes a MAC generator unit 111 in addition to each configuration of the transmitting side ECU 100 shown in FIG. 1. The MAC generator unit 111 generates, as an authenticator, a message authentication code (MAC) using the message (MSG) generated by the message generator unit 101 and the freshness value (FV) generated by the FV generator unit 102. For example, the message authentication code is generated by calculating based on a MAC algorithm using a MAC key stored in a memory (not shown) for data to which a freshness value is given or inserted in a message.

The transmitter unit 103 adds or inserts the freshness value generated by the FV generator unit 102 and the message authentication code generated by the MAC generator unit 111 to the message generated by the message generator unit 101, and further transmits the frame given with a header.

2. Configuration of Receiving Side ECU

In addition to each configuration of the receiving side ECU 200 shown in FIG. 1, the receiving side ECU 210 in FIG. 7 includes a verification MAC generator unit 211 and a MAC verifier unit 212.

The receiver unit 201 of the present embodiment receives the frame transmitted from the transmitting side ECU 110. This frame is a frame in which the message, and the freshness value and message authentication code which are added or inserted in the message are stored.

The FV verifier unit 203 of the present embodiment performs the same processing as the FV verifier unit 203 of the first embodiment. When it is determined that the freshness value is correct, the FV verifier unit 203 outputs the freshness value determined to be correct as a verification freshness value (verification FV) to the verification MAC generator unit 211 described later.

The verification MAC generator unit 211 acquires the MAC key stored in memory (not shown), and generates a verification message authentication code (verification MAC) using the MAC key, the message stored in the frame received by the receiver unit 201, and the verification freshness value output from the FV verifier unit 203. For example, a verification message authentication code is generated by calculating based on a MAC algorithm using a MAC key for data to which a verification freshness value is added or inserted into a message received by the receiver unit 103. The MAC key used by the verification MAC generator unit 211 is a key shared in advance with the transmitting side ECU.

The MAC verifier unit 212 compares and verifies the message authentication code stored in the frame received by the receiver unit 201 with the verification message authentication code generated by the verification MAC generator unit 211. When the message authentication code and the verification message authentication code match, it is determined that the message authentication code is correct and the verification result is correct (OK), and the received frame is processed. If they do not match, it is determined that the verification is not correct (NG), and the received frame is discarded.

3. Operation of Receiving Side ECU

Figure 8:
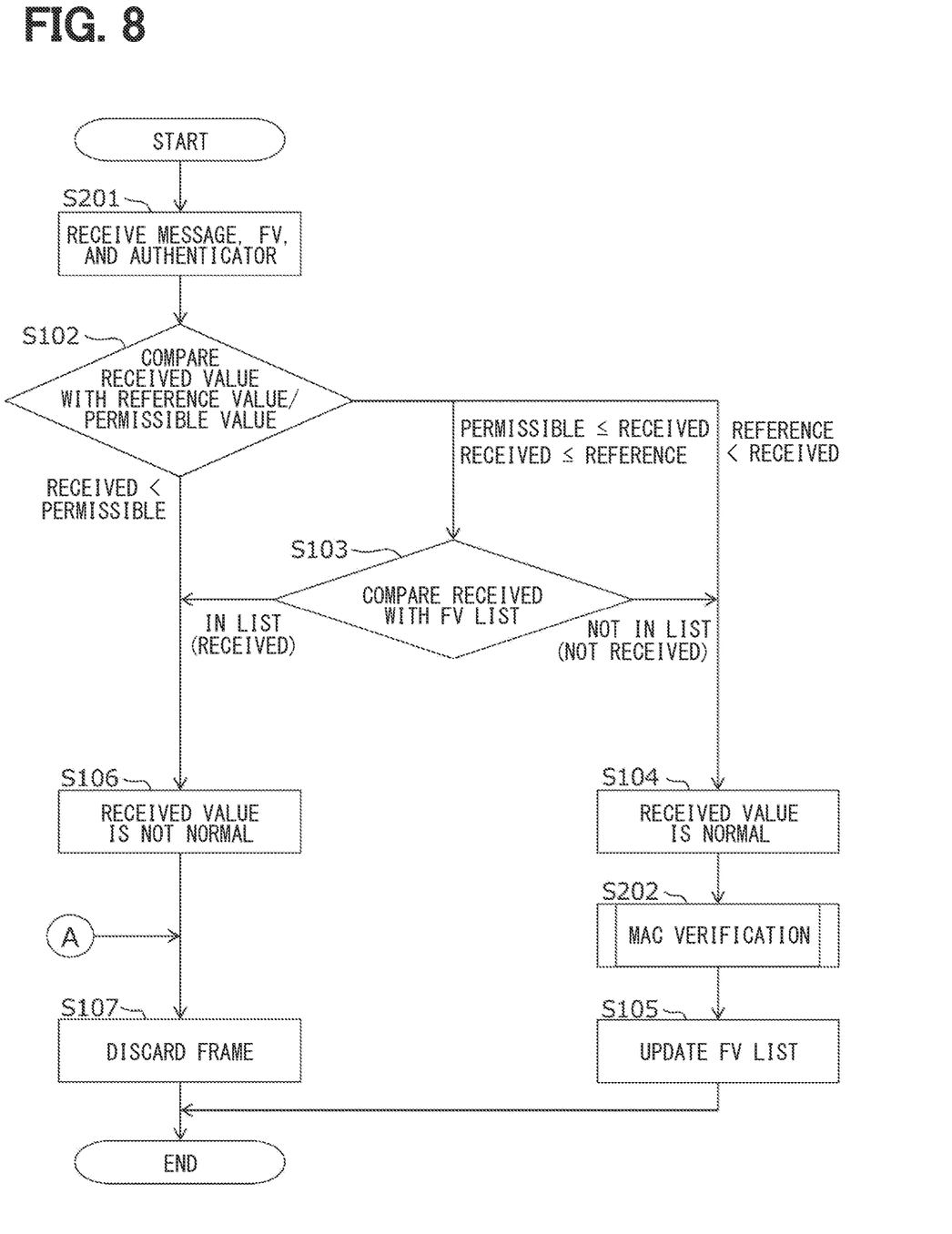
FIG. 8 is a diagram illustrating an operation of a receiving side electronic control unit according to the second embodiment.
Figure 9:
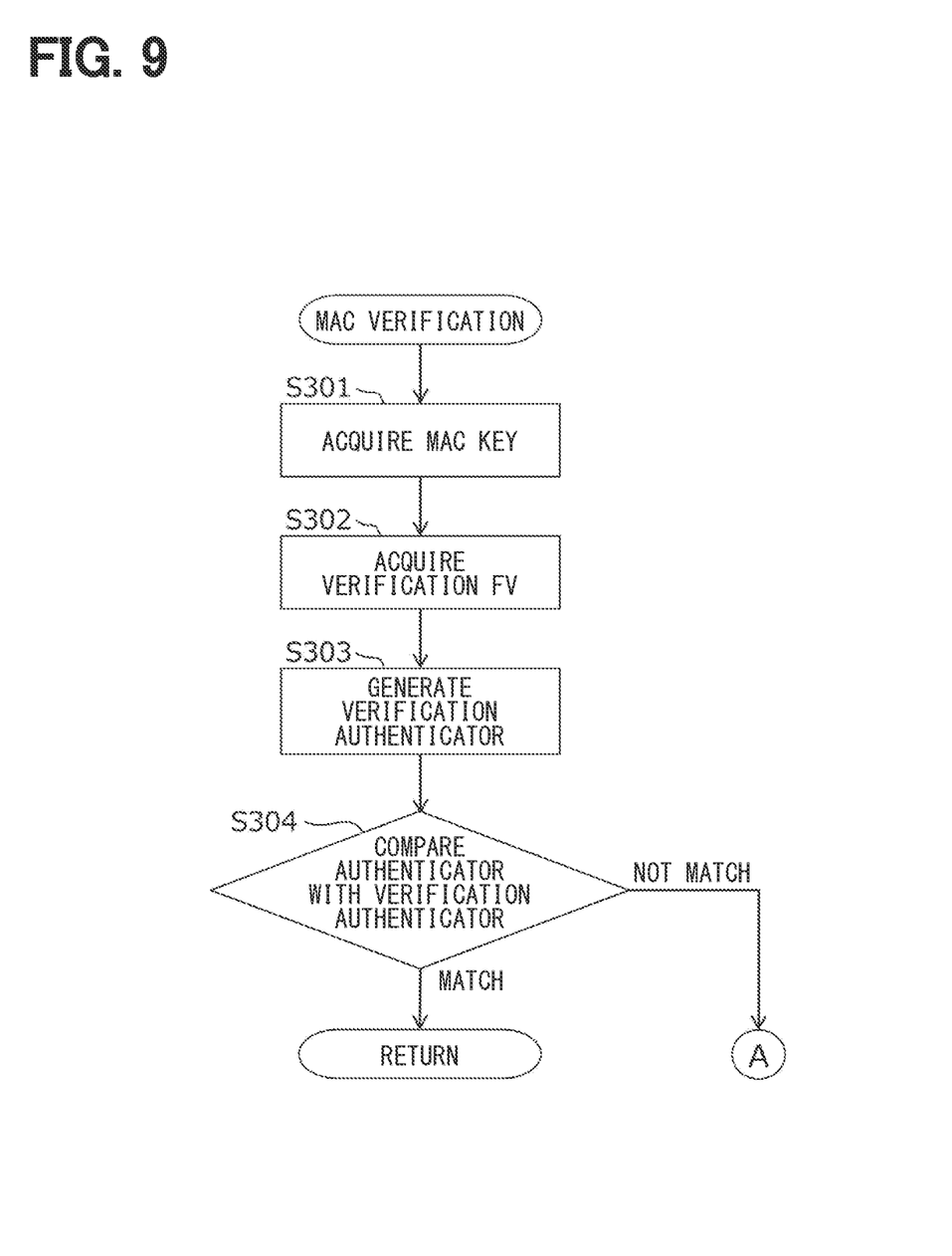
FIG. 9 is a diagram illustrating an operation of the receiving side electronic control unit according to the second embodiment.

The operation of the receiving side ECU 210 of this embodiment will be described with reference to FIGS. 8 and 9. The same processing as in FIG. 4 is designated by the same reference signs as in FIG. 4, and the description thereof will be omitted.

The receiving side ECU 210 of the present embodiment receives the message transmitted from the transmitting side ECU 110, the freshness value given to the message, and the message authentication code (S201).

Further, when it is determined in S104 that the received value of the freshness value is correct, MAC verification is performed (S202). As MAC verification, the following processing shown in the subroutine of FIG. 9 is performed. The MAC key stored in the memory is acquired (S301). The received value of the freshness value determined to be correct in S104 in FIG. 8 is acquired as the verification freshness value (S302).

A verification message authentication code is generated using the MAC key acquired in S301, the verification freshness value acquired in S302, and the message received by the receiver unit 201 (S303). The message authentication code received in S201 of FIG. 8 is compared with the verification message authentication code generated in S303 (S304). As a result of comparison in S304, when the message authentication code and the verification message authentication code match, the process shown in FIG. 9 is ended, the process proceeds to S105 shown in FIG. 8, and the FV list is updated. On the other hand, when the message authentication code and the verification message authentication code do not match, the process proceeds to A shown in FIG. 8 and the frame is discarded (S107).

For example, when a third party illegally falsifies the content of the frame transmitted from the transmitting side ECU 110, the message authentication code stored in the frame and the verification message authentication code generated by the receiving side ECU 210 do not match. As a result, the receiving side ECU 210 can detect an illegally tampered message.

According to the present embodiment, the correctness/incorrectness of the message is determined with high accuracy using the freshness value and the FV list, and the verification using the message authentication code is performed only when the verification result of the freshness value is correct. As a result, it is possible to suppress the generation process of the message authentication code having a heavy load and to improve the security of the communication system.

OVERVIEW

The features of the electronic control unit according to each embodiment of the present disclosure have been described above.

Terms used in the description of each embodiment are examples and may be replaced with synonymous terms or terms having a synonymous function.

The block diagram used in the description of each embodiment is a diagram in which the configurations of electronic control unit and the like are classified and organized by functions. These functional blocks are realized by any combination of hardware and/or software. Further, since the functions are shown, the block diagram can be understood as disclosure of the method.

Order of functional blocks that can be grasped as processing, a sequence, and a method described in relation to each embodiment may be changed unless some restriction is imposed, for example, a result from one step is utilized at another step.

The terms of "first" and "second" used in the description of each embodiment are for discriminating two or more configurations and methods of the same kind and do not limit order or superiority or inferiority.

Examples of electronic control units include semiconductors, electronic circuits, modules, and ECUs (electronic control units) as parts and semi-finished products. Further, the examples include, as finished products, a drive recorder, a car navigation system, a smartphone, a personal computer, a mobile phone, and a mobile information terminal.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via the recording medium or from a server via a communication line without using the recording medium. As a result, it is possible to always provide a latest function by updating the program.

INDUSTRIAL APPLICABILITY

Although the electronic control unit and the like of the present disclosure have been described with the electronic control unit mounted on the automobile in each embodiment in mind, it can be applied to all moving mobile objects such as motorcycles, ships, railroads, and aircraft. Moreover, it can be applied not only to mobile objects but also to all products including computers.

For reference to further explain features of the present disclosure, the description is added as follows.

In recent years, electronic control units have come to be used in vehicles such as automobiles not only for driving and braking, but also for the overall environment inside the vehicle, and communication. Further, the developments of (i) safe driving support systems that provide driving support to drivers and (ii) automatic driving systems that do not require the driver itself are becoming active. In these trends, unauthorized access to the in-vehicle network connected to the electronic control units becomes a big problem. If the electronic control unit is illegally controlled by unauthorized access by a malicious third party, the safety in driving a vehicle will be threatened. Therefore, various techniques related to the security of electronic control units for vehicles have been proposed.

One of the unauthorized access is called a replay attack, which steals a legitimate message and sends the stolen message as it is to impersonate the legitimate message. For such a replay attack, a method has been proposed which uses a counter or a time stamp given to the message to determine whether the message is a correct message or an incorrect message due to the replay attack.

For example, a first technique discloses that an illegal message due to a replay attack is detected by comparing the count value given to the message with the count value held by a receiving side ECU. Further, according to the method of the first technique, the counter is composed of a plurality of types of count values. This makes it difficult for the count value to pose a deviation between the transmitting side and the receiving side. Even if the counting value poses the deviation, it is possible to easily resynchronize between the transmitting side and the receiving side.

By the way, there are two types of communication: (i) a connection communication in which a communication is started after a connection is established, and (ii) a connectionless communication in which a communication is performed without a connection is established in advance. Unlike connection communication, the connectionless communication does not guarantee the packet reception order. The packet transmission order on the transmitting side may thus be different from the packet reception order on the receiving side. Suppose a case of determining the correctness/incorrectness of the message using the count value in a connectionless communication. In such a case, the receiving side may not consecutively receive the count values; a correct message may thus be erroneously determined to be incorrect.

To respond to such an error, other techniques describe the following. That is, a permissible range (window) of the sequence number is set, and the correctness/incorrectness of the message is determined based on whether or not the sequence number included in the message sent from the transmitting electronic control unit is within the predetermined permissible range. The permissible range is set by using the maximum value of the sequence number received in the past and the value obtained by subtracting a predetermined value from the maximum value.

By setting such a permissible range, it is possible to suppress erroneous determination of messages to some extent when the reception order is changed. However, with the above other techniques, it is not possible to set a permissible range according to the actual communication situation. Furthermore, the present inventor has found the following. That is, when the counter is composed of a plurality of types of count values as in the first technique, the counter value may change suddenly, and the reception order is changed at the time when such a sudden change occurs. Then, even if the permissible range described in the other techniques is used, an erroneous determination may occur.

It is thus desired for the present disclosure to provide an electronic control unit capable of determining the correctness/incorrectness of a message with a high accuracy.

Aspects of the present disclosure described herein are set forth in the following clauses.

According to a first aspect of the present disclosure, an electronic control unit is provided to receive a message and a freshness value given to the message from a transmitting side electronic control unit using a connectionless communication. The freshness value includes (i) upper bits that are updated according to a preset upper update condition and (ii) lower bits that are updated according to a preset lower update condition. The electronic control unit includes a storage unit, a receiver unit, a freshness value verifier unit, and a list update unit. The storage unit is configured to store a freshness value list, which indicates a predetermined number of freshness values in a descending order from a reference value, which is a largest freshness value among the freshness values received in a past. The receiver unit is configured to receive the message and the freshness value transmitted from the transmitting side electronic control unit. The freshness value verifier unit is configured to compare a received value, which is the freshness value received by the receiver unit, with the freshness value list to provide a verification result. The list update unit is configured to update the freshness value list so as to hold the received value in response to the verification result by the freshness value verifier unit indicating that (i) the received value is not larger than the reference value and not smaller than a permissible value which is a smallest freshness value in the freshness value list, and (ii) the received value is not in the freshness value list.

According to a second aspect of the present disclosure, a communication system is provided to include a transmitting side electronic control unit that transmits a message using a connectionless communication and a receiving side electronic control unit that receives the message. The transmitting side electronic control unit includes a transmitter unit configured to transmit the message and a freshness value given to the message. The freshness value includes (i) upper bits that are updated according to a preset upper update condition and (ii) lower bits that are updated according to a preset lower update condition. The receiving side electronic control unit includes a storage unit, a receiver unit, a freshness value verifier unit, and a list update unit. The storage unit is configured to store a freshness value list, which indicates a predetermined number of freshness values in a descending order from a reference value, which is a largest freshness value among the freshness values received in a past by the receiving side electronic control unit. The receiver unit is configured to receive the message and the freshness value transmitted from the transmitting side electronic control unit. The freshness value verifier unit is configured to compare a received value, which is the freshness value received by the receiver unit, with the freshness value list to provide a verification result. The list update unit is configured to update the freshness value list so as to hold the received value in response to the verification result by the freshness value verifier unit indicating that (i) the received value is not larger than the reference value and not smaller than a permissible value which is a smallest freshness value in the freshness value list, and (ii) the received value is not in the freshness value list.

According to a third aspect of the present disclosure, a message reception program is provided to be executed by a receiving side electronic control unit configured to receive a message and a freshness value given to the message from a transmitting side electronic control unit using a connectionless communication. The freshness value includes (i) upper bits that are updated according to a preset upper update condition and (ii) lower bits that are updated according to a preset lower update condition. The message reception program includes instructions of: (i) receiving the message and the freshness value transmitted from the transmitting side electronic control unit; (ii) comparing a received value that is the received freshness value with a freshness value list, which indicates a predetermined number of freshness values in a descending order from a reference value, which is a largest freshness value among the freshness values received by the receiving side electronic control unit to provide a verification result; and (iii) updating the freshness value list so as to hold the received value in response to the verification result indicating that (a) the received value is not larger than the reference value and not smaller than a permissible value which is a smallest freshness value in the freshness value list, and (b) the received value is not in the freshness value list.

According to a fourth aspect of the present disclosure, a message reception method is provided to be executed by a receiving side electronic control unit configured to receive a message and a freshness value given to the message from a transmitting side electronic control unit using a connectionless communication. The freshness value includes (i) upper bits that are updated according to a preset upper update condition and (ii) lower bits that are updated according to a preset lower update condition. The message reception method includes: (i) receiving the message and the freshness value transmitted from the transmitting side electronic control unit; (ii) comparing a received value that is the received freshness value with a freshness value list, which indicates a predetermined number of freshness values in a descending order from a reference value, which is a largest freshness value among the freshness values received by the receiving side electronic control unit to provide a verification result; and (iii) updating the freshness value list so as to hold the received value in response to the verification result indicating that (a) the received value is not larger than the reference value and not smaller than a permissible value which is a smallest freshness value in the freshness value list, and (b) the received value is not in the freshness value list.

According to the electronic control unit, the communication system, the message reception program product, and the message reception method of the present disclosure, the correctness/incorrectness of a message can be determined using a permissible range automatically set according to a communication status between the electronic control units. Thus, the accuracy of the determination can be improved. Further, even when the freshness value changes abruptly depending on the composition of the freshness value, it is possible to determine the correctness/incorrectness of the message with a high accuracy.

What is claimed is:

1. An electronic control unit configured to receive a message and a freshness value given to the message from a transmitting side electronic control unit using a connectionless communication, the freshness value including (i) upper bits that are updated according to a preset upper update condition and (ii) lower bits that are updated according to a preset lower update condition, the electronic control unit comprising:
a storage configured to store a freshness value list, which indicates a predetermined number of freshness values in a descending order from a reference value, which is a largest freshness value among the freshness values received in a past;
a receiver configured to receive the message and the freshness value transmitted from the transmitting side electronic control unit;
a freshness value verifier unit configured to compare a received value, which is the freshness value received by the receiver, with the freshness value list to provide a verification result; and
a list update unit configured to update the freshness value list so as to hold the received value in response to the verification result by the freshness value verifier unit indicating that (i) the received value is not larger than the reference value and not smaller than a permissible value which is a smallest freshness value in the freshness value list, and (ii) the received value is not in the freshness value list.

2. The electronic control unit according to claim 1, wherein:
the list update unit is further configured to update the freshness value list so as to hold the received value in response to the verification result by the freshness value verifier unit indicating that the received value is larger than the reference value.

3. The electronic control unit according to claim 1, further comprising:
a verification MAC generator unit configured to generate a verification message authentication code from the message and the received value in response to the verification result by the freshness value verifier unit indicating that (i) the received value is not larger than the reference value and not smaller than the permissible value and (ii) the received value is not in the freshness value list; and
a MAC verifier unit,
wherein:
the receiver is further configured to receive a message authentication code given to the message;
the MAC verifier unit is configured to verify an identity between the message authentication code and the verification message authentication code; and
the list update unit is further configured to update the freshness value list so as to hold the received value in response to the identity being affirmatively verified between the message authentication code and the verification message authentication code.

4. The electronic control unit according to claim 1, wherein:
a value of the upper bits indicates a number of activations of the transmitting side electronic control unit, and a value of the lower bits indicates a number of messages that are transmitted by the transmitting side electronic control unit.

5. The electronic control unit according to claim 1, wherein:
the storage includes a non-volatile memory and a volatile memory; and
a value of the upper bits of the freshness value received by the receiver is stored in the non-volatile memory, and a value of the lower bits of the freshness value received by the receiver is stored in the volatile memory.

6. The electronic control unit according to claim 1, wherein:
the list update unit is further configured to set the predetermined number according to the verification result by the fresh value verifier unit.

7. The electronic control unit according to claim 1, further comprising:
a processor communicably coupled to the storage and the receiver, the processor being configured to implement the freshness value verifier unit and the list update unit.

8. A communication system including a transmitting side electronic control unit that transmits a message using a connectionless communication and a receiving side electronic control unit that receives the message,
the transmitting side electronic control unit comprising:
a transmitter configured to transmit the message and a freshness value given to the message, the freshness value including (i) upper bits that are updated according to a preset upper update condition and (ii) lower bits that are updated according to a preset lower update condition,
the receiving side electronic control unit comprising:
a storage configured to store a freshness value list, which indicates a predetermined number of freshness values in a descending order from a reference value, which is a largest freshness value among the freshness values received in a past by the receiving side electronic control unit;
a receiver configured to receive the message and the freshness value transmitted from the transmitting side electronic control unit;
a freshness value verifier unit configured to compare a received value, which is the freshness value received by the receiver, with the freshness value list to provide a verification result; and
a list update unit configured to update the freshness value list so as to hold the received value in response to the verification result by the freshness value verifier unit indicating that (i) the received value is not larger than the reference value and not smaller than a permissible value which is a smallest freshness value in the freshness value list, and (ii) the received value is not in the freshness value list.

9. The communication system according to claim 8, wherein:
the receiving side electronic control unit further comprises:
a processor communicably coupled to the storage and the receiver, the processor being configured to implement the freshness value verifier unit and the list update unit.

10. A message reception method implemented by a processor in a receiving side electronic control unit configured to receive a message and a freshness value given to the message from a transmitting side electronic control unit using a connectionless communication, the freshness value including (i) upper bits that are updated according to a preset upper update condition and (ii) lower bits that are updated according to a preset lower update condition,
the message reception method comprising:
receiving the message and the freshness value transmitted from the transmitting side electronic control unit;
comparing a received value that is the received freshness value with a freshness value list, which indicates a predetermined number of freshness values in a descending order from a reference value, which is a largest freshness value among the freshness values received by the receiving side electronic control unit to provide a verification result; and
updating the freshness value list so as to hold the received value in response to the verification result indicating that (i) the received value is not larger than the reference value and not smaller than a permissible value which is a smallest freshness value in the freshness value list, and (ii) the received value is not in the freshness value list.

11. A non-transitory computer readable storage medium comprising instructions for execution by a computer, the instructions including the message reception method according to claim 10, the method being computer-implemented.

* * * * *